United States Patent [19]
Hashimoto

[11] Patent Number: 5,261,121
[45] Date of Patent: Nov. 9, 1993

[54] PORTABLE RADIO TRANSCEIVER SYSTEM HAVING IMPROVED ADAPTOR AND/OR IMPROVED RECEIVER SIGNAL CONTROL ARRANGEMENT

[75] Inventor: Kazuya Hashimoto, Tokyo, Japan

[73] Assignee: NEC Corporation, Tokyo, Japan

[21] Appl. No.: 566,672

[22] Filed: Aug. 13, 1990

[30] Foreign Application Priority Data

Aug. 11, 1989 [JP] Japan .................................. 1-206699
Sep. 5, 1989 [JP] Japan .................................. 1-230815

[51] Int. Cl.$^5$ ............................................. H04B 1/38
[52] U.S. Cl. ................................. 455/89; 455/127; 455/277.1
[58] Field of Search .................... 455/89, 90, 127, 343, 455/277, 277.1, 277.2, 272, 275, 289

[56] References Cited
U.S. PATENT DOCUMENTS

| | | | |
|---|---|---|---|
| 4,641,366 | 7/1987 | Yokoyama | 455/89 |
| 4,673,861 | 6/1987 | Dubovsky et al. | 455/89 |
| 4,829,591 | 5/1989 | Hashimoto et al. | 455/89 |
| 4,914,714 | 4/1990 | Tamura | 455/277 |
| 4,939,788 | 7/1990 | Hasegawa | 455/241.1 |
| 4,962,523 | 10/1990 | Tanaka | 455/89 |

*Primary Examiner*—Reinhard J. Eisenzopf
*Assistant Examiner*—Edward Urban
*Attorney, Agent, or Firm*—Laff, Whitesel, Conte & Saret

[57] ABSTRACT

In order to enable a diversity reception in a portable radiotelephone without detrimentally increasing the size and weight thereof, an adaptor to which diversity antennas are coupled and into which the radiotelephone is inserted in an in-car mode, is provided with a diversity switch and a diversity switch controller. The portable radiotelephone is arranged to switch over from its own antenna to the diversity antennas upon insertion into the adaptor. The portable radiotelephone is further provided with an arrangement for exhibiting a correct receive signal strength irrespective of the fact it is set in the adaptor or used in a portable mode.

6 Claims, 5 Drawing Sheets

PORTABLE RADIO TRANSCEIVER SYSTEM HAVING IMPROVED ADAPTOR AND/OR IMPROVED RECEIVER SIGNAL CONTROL ARRANGEMENT

BACKGROUND OF THE INVENTION

1. Field of the Invention

The present invention relates generally to a portable radio transceiver system, and more specifically to such a system which is provided with an improved adaptor for a portable radio transceiver and/or improved receive signal control arrangements.

2. Description of the Prior Art

A portable radio transceiver, such as a portable radiotelephone or the like, is designed with primary importance placed on transportability and, accordingly, is required to be small in size and light in weight.

A mobile transceiver is susceptible to so-called fading which is the variation of radio field intensity caused by changes in the transmission medium, and transmission path, with time. In order to minimize the effects of fading, a diversity scheme has been proposed. The diversity scheme is a method that is used to develop information from several signals transmitted over independently fading paths.

In order to obtain wider usage of a portable radiotelephone, viz., enable the use both outside and inside of an automotive vehicle or the like, it is a current tendency that a portable radio transceiver is designed to be attachable to a vehicle mounted adaptor when used in a passenger compartment of a vehicle.

However, a conventional vehicular adaptor is designed simply for coupling a portable radio transceiver to a car battery, a handset provided in the vehicle compartment, etc. More specifically, no prior art technique has suggested the concept of equipping a vehicular adaptor of the above mentioned type with circuitry for diversity reception.

According to a known technique, an arrangement for diversity reception is provided in the portable radio transceiver itself. However, this results in an undesirable increase in size and weight of the device.

Further, it is a common practice to provide a mobile telephone (i.e. portable radio transceiver or radiotelephone as it will be referred to hereinafter) with an indicator which shows the strength of the signal being received. An input signal to the indictor may further be used to indicate whether or not a portable radiotelephone is within a service area or not. However, a known portable radiotelephone is only provided with a single threshold level with which the receive signal strength is compared to indicate magnitude of electric field in which it is located. As a result, the known portable radiotelephone has encountered the problem that the receive signal strength varies notably between a portable mode and an in-car (vehicle mounted) mode.

This difficulty is accentuated when a portable radiotelephone is coupled to a vehicular adaptor. That is to say, upon a portable telephone being set into the adaptor, a car battery energizes some portions of the portable telephone such as a radio frequency (RF) amplifier, a mixer, etc. Since a car battery voltage is higher than a rechargeable battery installed in the portable telephone, the indicator undesirably exhibits a higher value irrespective of the fact that the electric field strength has not changed. (By way of example, a car battery is 12.5 volts while a rechargeable battery 6 volts.)

SUMMARY OF THE INVENTION

It is an object of the present invention to provide a portable radio transceiver system which includes an improved vehicular adaptor, to which diversity antennas are coupled and which includes a diversity switch and a diversity switch controller.

Another object of the present invention is to provide a portable radio transceiver system wherein a portable transceiver is provided with an improved arrangement for exhibiting a correct receive signal strength.

In brief, the above objects are achieved by a vehicle mounted adaptor which is provided with a diversity switch and a diversity switch controller. The adaptor is coupled to diversity antennas and removably receives a portable radiotelephone in an in-car mode. The portable radiotelephone is arranged to switch over from its own antenna to the diversity antennas upon insertion into the adaptor. The portable radiotelephone is further provided with an arrangement for exhibiting a correct receive signal strength irrespective of the fact it is set in the adaptor or used in a portable mode.

More specifically a first aspect of the present invention comes in a portable radio transceiver system which includes a portable radio transceiver and an adaptor, said adaptor being mounted in a vehicle and removably receiving said portable radio transceiver, said adaptor comprising: diversity switch means, said diversity switch means being coupled to diversity antennas and adapted to select one of said diversity antennas and output a first signal to said portable radio transceiver; and switch control means, said switch control means being coupled to said diversity switch means, said switch control means receiving a second signal from said portable radio transceiver indicative of the strength of said first signal, and outputting a third signal in the event that a level of said second signal falls below a predetermined level, said third signal being applied to said diversity switch means and controlling the switching thereof.

A second aspect of the present invention comes in a portable radio transceiver system which includes a portable radio transceiver and an adaptor, said adaptor being mounted in a vehicle and removably receiving said portable radio transceiver, said portable transceiver comprising: control signal generating means, said control signal generating means outputting a control signal which assumes a control level in response to attachment of said portable radio transceiver to said adaptor; first switch means, said first switch means being responsive to said control signal and switching from a battery installed therein to a vehicle mounted battery by way of said adaptor; a first signal generator, said first signal generator outputting a first reference signal; a second signal generator, said second signal generator outputting a second reference signal, said second reference signal having a level which is lower than a level of said first reference signal; second switch means, said second switch means being responsive to said control signal and switching between said first and second signal generators; and a comparator, said comparator being coupled to receive one of said first and second reference signals via said third switch, said comparator comparing a signal indicative of the strength of an antenna received signal with one of said first and second reference signals.

A third aspect of the present invention comes in a portable radio transceiver system which includes a portable radio transceiver and an adaptor, said adaptor being mounted in a vehicle and removably receiving said portable radio transceiver, said adaptor comprising: diversity switch means, said diversity switch means being coupled to diversity antennas and adapted to select one of said diversity antennas and output a first signal to said portable radio transceiver; and switch control means, said switch control means being coupled to said diversity switch means, said switch control means receiving a second signal from said portable radio transceiver indicative of the strength of said first signal, and outputting a third signal in the event that a level of said second signal falls below a predetermined level, said third signal being applied to said diversity switch means and controlling the switching thereof, said portable radio transceiver comprising: control signal generating means, said control signal generating means outputting a control signal which assumes a control level in response to attachment of said portable radio transceiver to said adaptor; and first switch means, said first switch means being responsive to said control signal and switching from an antenna coupled to said portable transceiver to said diversity antennas.

A fourth aspect of the present invention comes in a portable radio transceiver system which includes a portable radio transceiver and an adaptor, said adaptor being mounted in a vehicle and removably receiving said portable radio transceiver, said adaptor comprising: diversity switch means, said diversity switch means being coupled to diversity antennas and adapted to select one of said diversity antennas and output a first signal to said portable radio transceiver; and switch control means, said switch control means being coupled to said diversity switch means, said switch control means receiving a second signal from said portable radio transceiver indicative of the strength of said first signal, and outputting a third signal in the event that a level of said second signal falls below a predetermined level, said third signal being applied to said diversity switch means and controlling the switching thereof, said portable radio transceiver comprising: control signal generating means, said control signal generating means outputting a control signal which assumes a control level in response to attachment of said portable radio transceiver to said adaptor; first switch means, said first switch means being responsive to said control signal and switching from an amtenna coupled to said portable transceiver to said diversity antennas; second switch means, said second switch means being responsive to said control signal and switching from a battery installed therein to a vehicle mounted battery coupled to said adaptor; a first signal generator, said first signal generator outputting a first reference signal; a second signal generator, said second signal generator outputting a second reference signal, said second reference signal having a level which is lower than a level of said first reference signal; third switch means, said third switch means being responsive to said control signal and switching between said first and second signal generators; and a comparator, said comparator being coupled to receive one of said first and second reference signals via said third switch, said comparator comparing said second signal with said one of said first and second reference signals.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
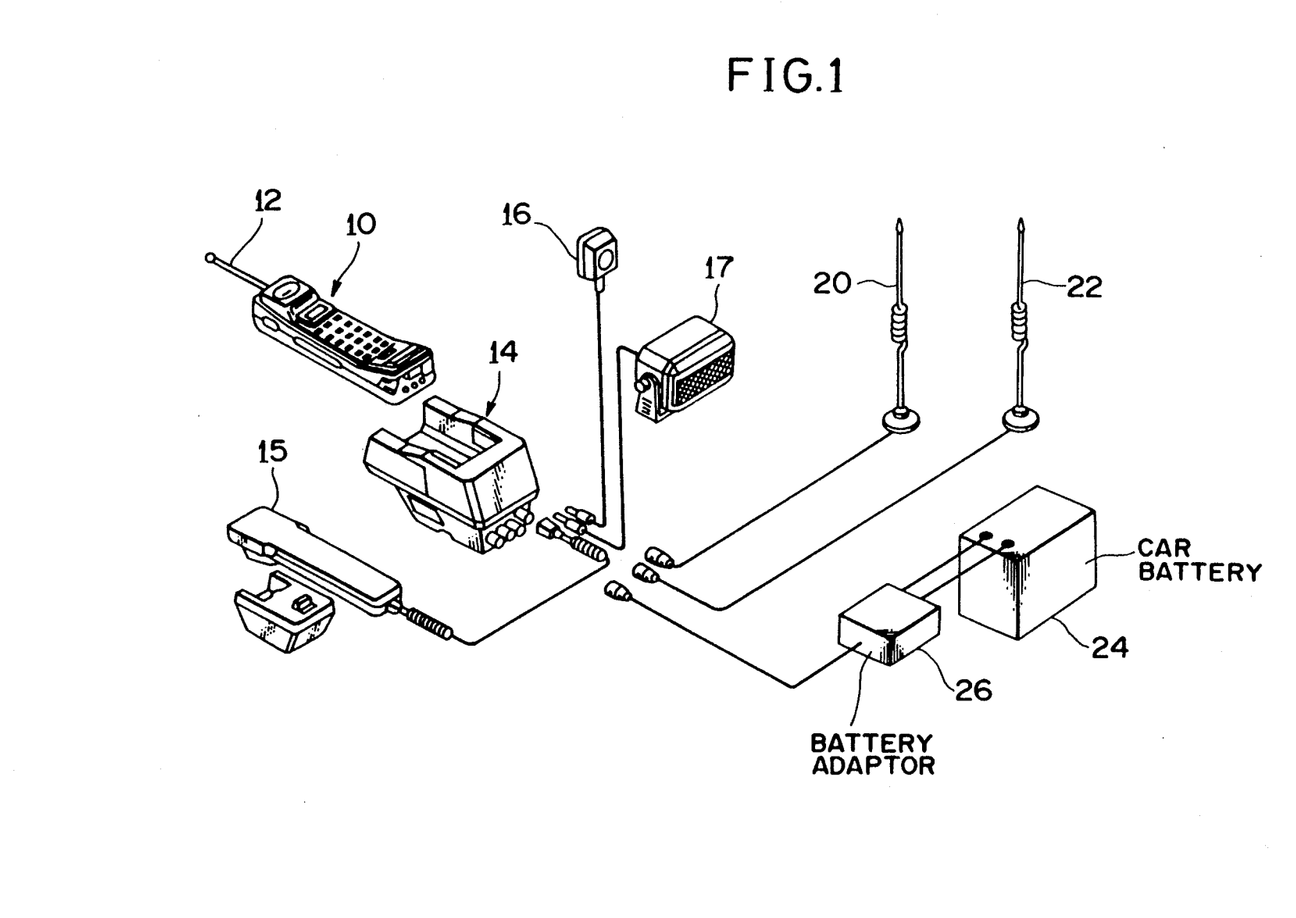
FIG. 1 is a schematic perspective view of a portable radio transceiver system according to the present invention.

Reference is now made to FIG. 1, wherein there is shown in perspective, a portable radiotelephone system according to the present invention.

This system comprises a portable subscriber type radiotelephone 10 which when used outside of the vehicle makes use of an antenna 12 which is included therein. On the other hand, when the device is used within the vehicle it is set in an adaptor 14. As shown, this adaptor 14 is arranged to be coupled not only to a handset 15 but to a "hands free" microphone 16 and a speaker 17.

The adaptor 14 is connected to first and second diversity antennas 20, 22 and to a car battery 24 via a suitable battery adaptor 26.

Figure 2:
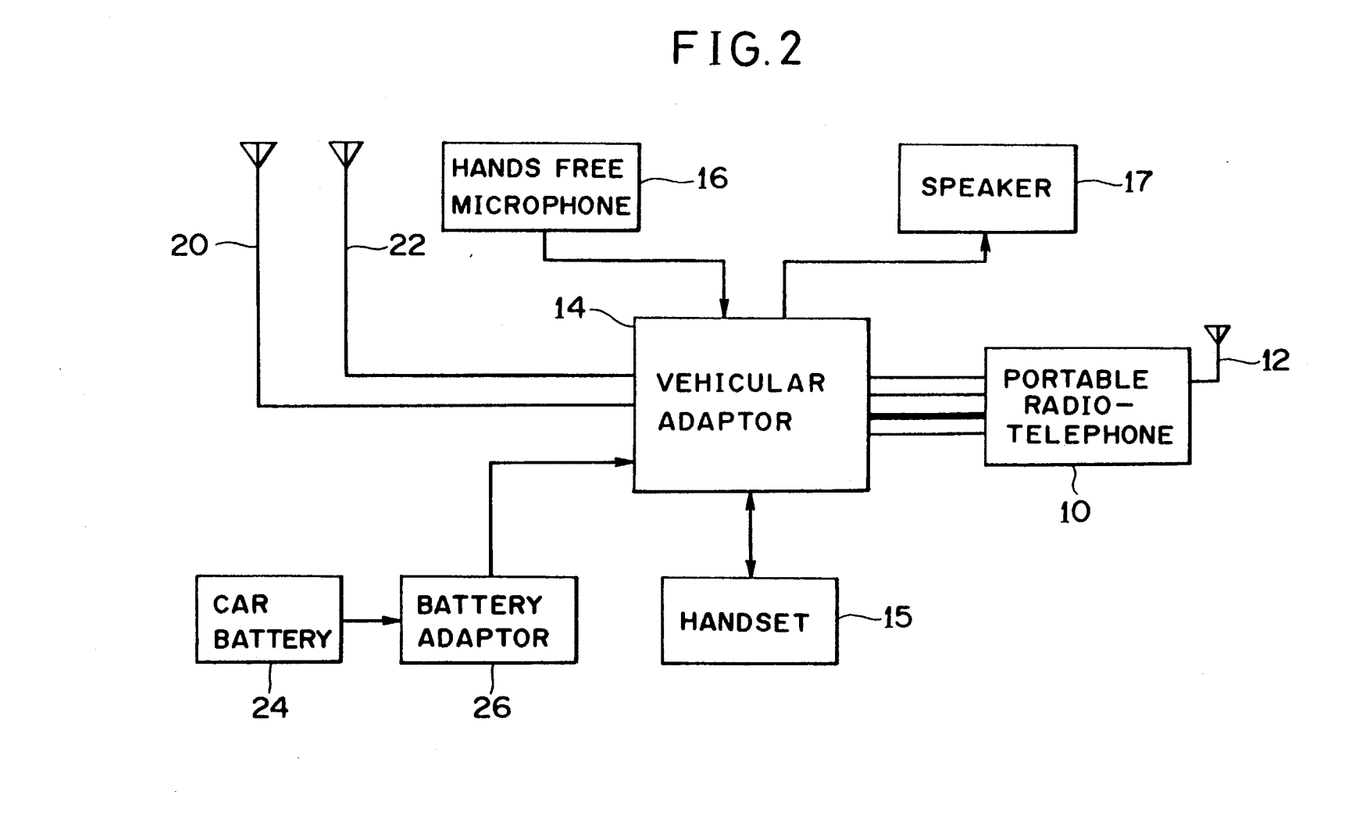
FIG. 2 is a block diagram showing a portable radio transceiver system shown in FIG. 1.

FIG. 2 depicts the portable radiotelephone system shown in FIG. 1 in block diagram form. Description of this arrangement is deemed unnecessary.

A first embodiment of this invention will be discussed with reference to FIG. 3.

As shown, the vehicular adaptor 14 is coupled to the portable radiotelephone 10 via terminals 34a, 34b, 34c, 34d, 38a, 38b, 38c and 38d. The adaptor 14 is equipped with a diversity switch 30 which switches over between terminals 30a, 30b thereof in response to a control signal applied from a diversity switch controller 32. The terminals 30a, 30b of the switch 30 are respectively coupled to the antennas 20, 22 via terminals 36a, 36b, while a terminal 30c of the switch 30 is coupled to a duplexer (not shown in the Figure) of the portable set 10 via the terminals 34a, 38a. The controller 32 has an output coupled to the switch 30 and an input coupled to an intermediate frequency (IF) amplifier (not shown in this Figure) of the portable set 10 via the terminals 34b, 38b. The portable radiotelephone 10 will be discussed in detail with reference to FIG. 5.

The adaptor 14 has a set interface terminals 40a, 40b, 40c and 40d which are respectively coupled to the blocks 15, 16, 17 and 26 all of which are shown in each of FIGS. 1 and 2.

Figure 3:
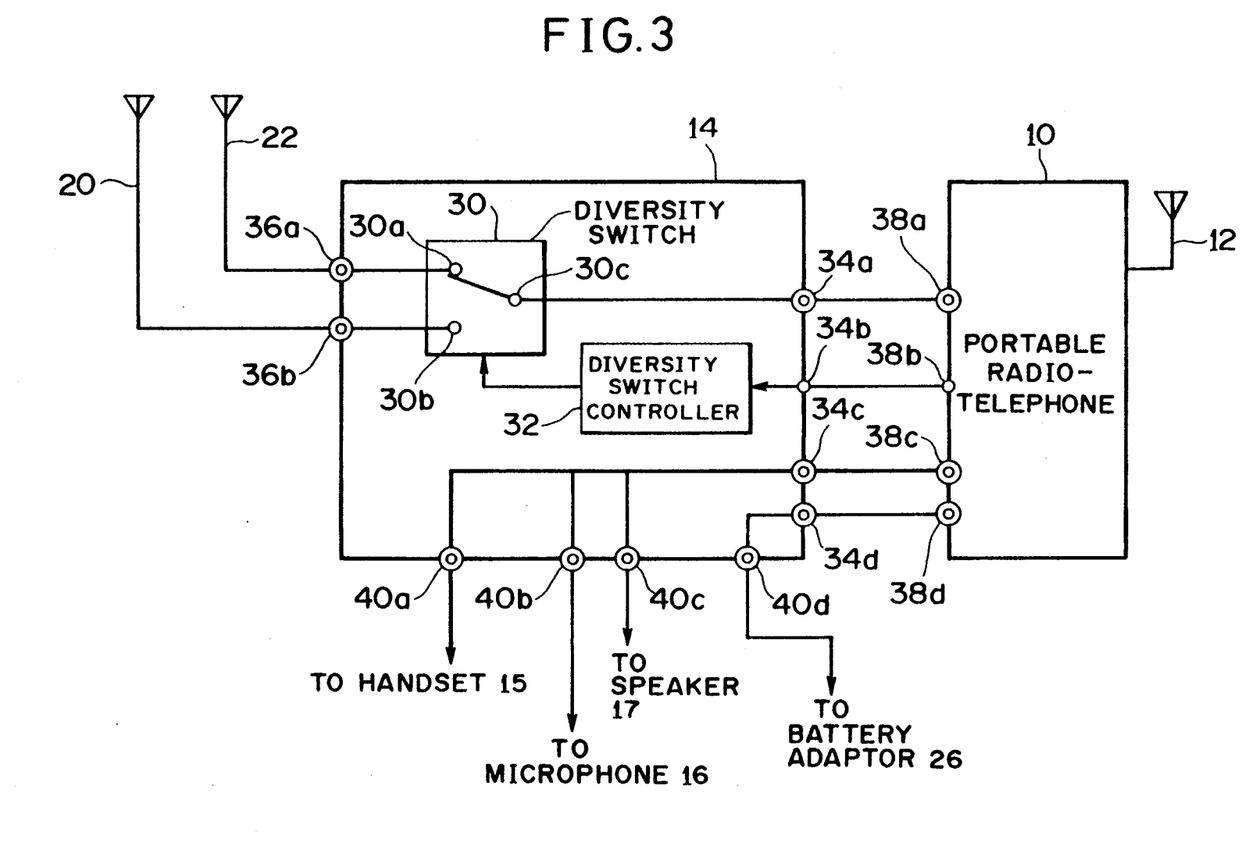
FIG. 3 is a block diagram showing a vehicular adaptor of the present invention together with a portable radiotelephone set.

When the portable set 10 is coupled to the vehicular adaptor 14 as illustrated in FIG. 3, it is automatically switched over from the antenna 12 to the diversity antennas 20, 22 by way of the adaptor 14. The automatic switching will be described later with reference to FIG.

Figure 5:
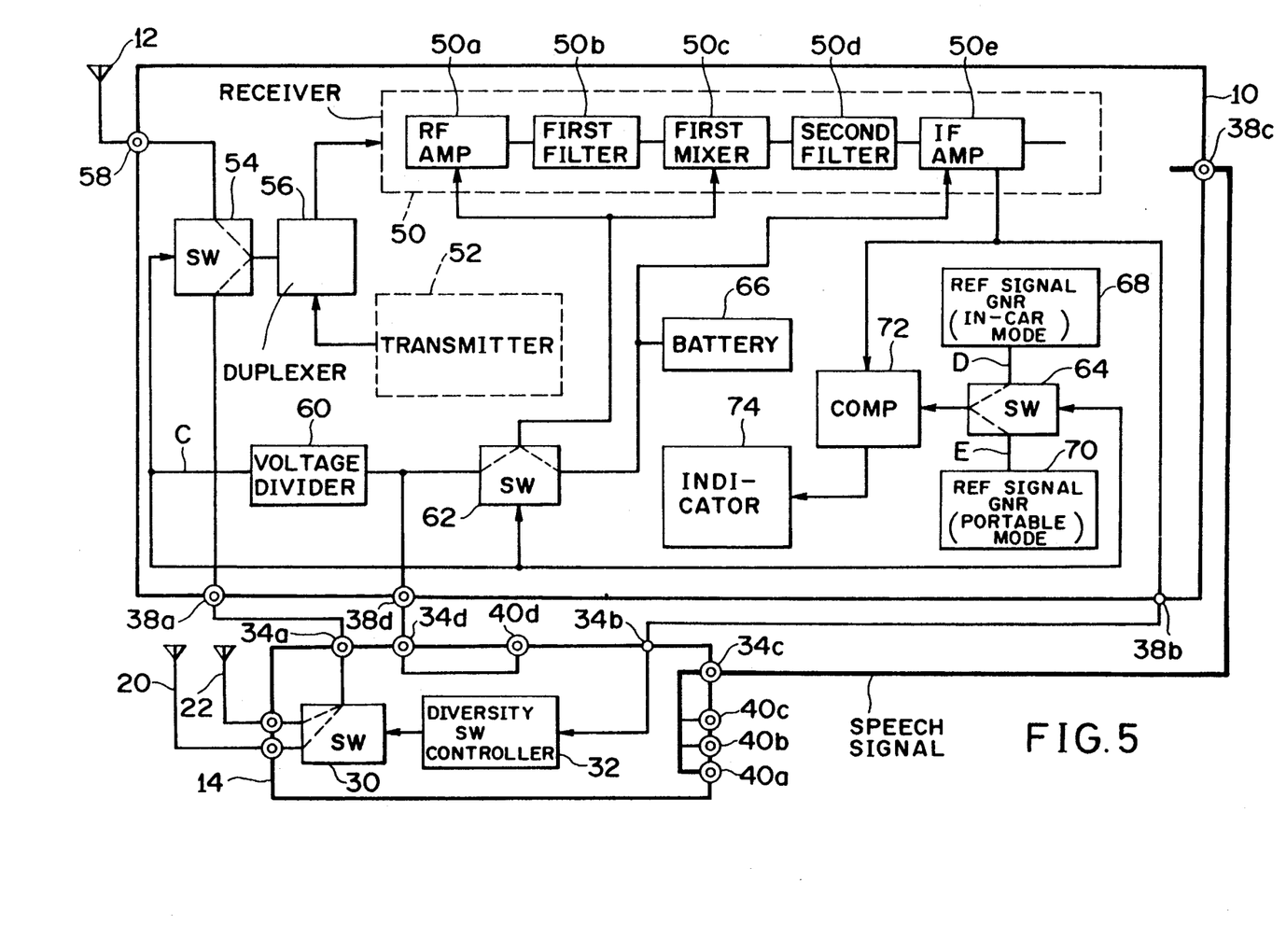
FIG. 5 is a block diagram showing a portable radiotelephone and a vehicular adaptor which are arranged in accordance with the concept of the present invention.

5. The diversity switch controller 32 is supplied with a direct current signal derived from the IF amplifier, which is proportional to a radio frequency signal received at either of the diversity antennas 20, 22. The controller 32 compares the inputted signal with a threshold level. In the event that the controller 32 detects that the signal inputted from the portable set 12 falls below the threshold level, the controller applies a control signal to the diversity switch 30. In response to the control signal, the switch 30 selects the other antenna.

Figure 4:
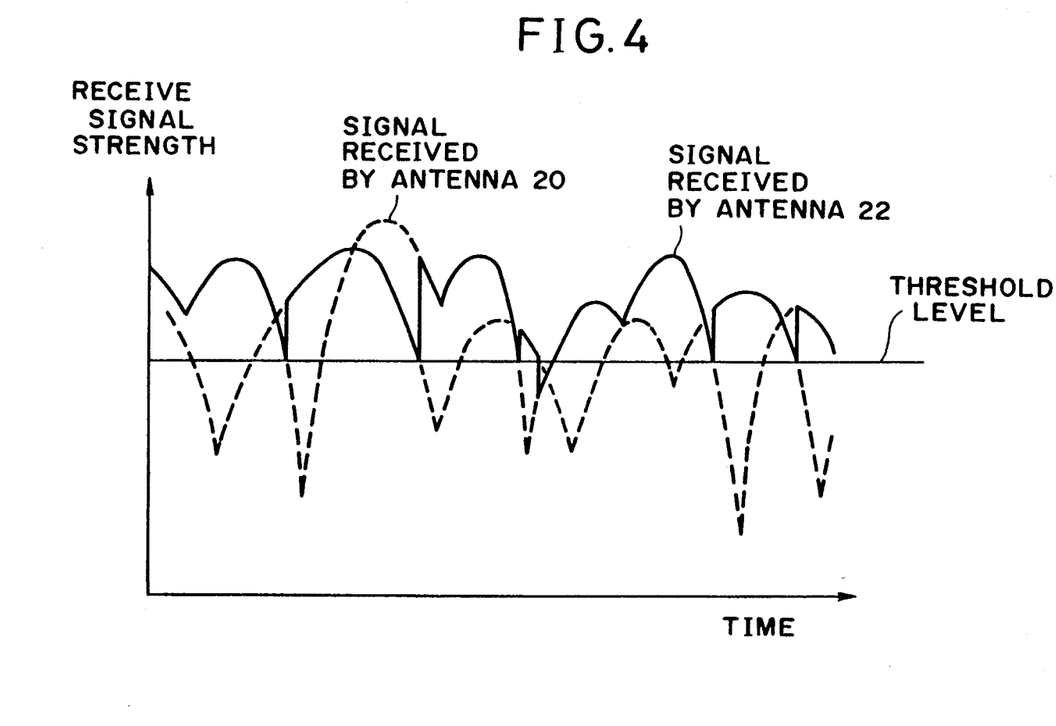
FIG. 4 is a graph showing variations of signal strength received by diversity antennas.

FIG. 4 is a graph showing variations of signal strength received by the diversity antennas 20, 22. In this drawing, the solid line indicates the signal which is supplied to the portable radiotelephone set 10. It will be understood from the drawing that the antennas 20, 22 are switched over when the receive signal strength falls to the threshold level. The diversity operations are well known in the art and hence further descriptions thereof will be omitted for brevity.

As will be appreciated from the foregoing, the portable set 10 can effectively be reduced in size and weight in that the arrangement for diversity reception is provided in the vehicle mounted adaptor 14.

Reference is now made to FIG. 5, wherein a second embodiment of this invention is shown in block diagram form.

The portable radiotelephone set 10 is provided with a receiver 50 and a transmitter 52, both of which are interconnected to an antenna switch 54 via a duplexer 56. The switch 54 is coupled to the antenna 12 via a terminal 58, while coupled to the vehicular adaptor 14 via the switches 38a, 34a. The adaptor 14 has been described in detail in connection with FIG. 3. The antenna switch 54 is controlled by a control signal C applied from a voltage divider 60 which is provided for lowering a car battery voltage appearing at the terminal 38d. The control signal C is also applied to two switches 62 and 64 which are respectively provided for switching power sources and for switching reference signals, as will be described.

The receiver 50 takes the form of a double-superheterodyne arrangement in this particular embodiment, and includes an RF amplifier 50a, a first filter 50b, a first mixer 50c, a second filter 50d and an IF amplifier 50e. Merely for the sake of simplifying the drawing, the receiver 50 is not shown as being provided with a local oscillator to be coupled to the mixer 50c and a second mixer preceded by the IF amplifier 50e together with another local oscillator connected thereto. Further, the transmitter 52 is not shown in detail in that the present invention is not concerned therewith.

As shown, the power supply switch 62 is coupled to the RF amplifier 50a and the mixer 50c in this particular embodiment, the reason of which is to increase the output of the mixer 50c in the case where the portable set 10 is coupled to the car battery 24 when placed in the adaptor 14. The portable set 10 is provided with a battery 66. Although not shown in detail in the drawing, it should be noted that the battery 66 is recharged when the portable set 12 is set in the vehicular adaptor 14. As will be appreciated this circuit arrangement is omitted for the sake of simplicity.

The switch 64 is coupled to two reference signal generators 68, 70 and selects either one thereof in response to the control signal C. More specifically, the generator 68 is switched to a comparator 72 when the portable set 10 is coupled to the adaptor 14 (in-car mode), while the generator 70 is coupled to the comparator 72 upon the portable set 10 being detached from the adaptor 14 (viz., used in the portable mode). The comparator 72 compares the output of the switch 64 with the above-mentioned DC voltage which is proportional to the receive signal strength. It should be noted that the DC voltage is obtained at the stage of the IF amplifier 50e by a conventional technique.

Returning to the generators 68, 70, these devices are such as to output reference signals whose levels are D and E (indicated in the drawing). These levels are previously determined such that the level D is higher than the level E and such that the comparator 72 outputs a signal whose level is substantially identical independently of the above-mentioned two modes. Accordingly, an indicator 74 is able to exhibit substantially the same level irrespective of the fact it is set in the adaptor 14 or used in the portable mode. In the above description, each of the generators 68, 70 outputs a single reference level. However, considering users' requirements of multilevel indications of signal strength, it is practical or realistic to modify the generators 68, 70 such that each of them outputs a set of reference levels.

The operation of the FIG. 5 arrangement will further be discussed in more detail.

When the portable set 10 is coupled to the vehicular adaptor 14 as illustrated, a car battery voltage appearing at the terminal 34d is applied to the voltage divider 60 and the switch 62 by way of the terminal 38d. The voltage divider 60 lowers the car battery voltage to a level appropriate to control the switches 54, 62 and 64. The switch 54 selects the diversity antennas 20, 22 in response to the control signal C assuming a high level (for example). Thus, the portable set 10, now coupled to the adaptor 14, is ready for diversity reception.

Further, in response to the control signal C assuming a high level, the switch 62 selects the car battery voltage while the switch 64 selects the reference generator 68.

In the event the portable set 10 is detached from the adaptor, the switches 54, 62 and 64 select the antenna 12, the battery 66 and the reference generator 70, respectively.

It should be noted that throughout the instant specification a term "radiotelephone" is predominantly used. However, the scope of this invention is such as to include any type of mobile radio transceiver.

While the foregoing description describes two embodiments according to the present invention, the various alternatives and modifications possible without departing from the scope of the present invention, which is limited only by the appended claims, will be apparent to those skilled in the art.

What is claimed is:

1. A portable radio-transceiver system comprising:
    a portable radio transceiver means for sending and receiving information;
    means comprising diversity antennas for simultaneously sending and receiving two radio signals at slightly different frequencies, said diversity antennas being fixable to a vehicle;
    an adaptor for mounting in the vehicle for removably receiving said portable radio transceiver, said adaptor being coupled to said diversity antennas,
    said adaptor including;
    diversity switch means which is coupled to said diversity antennas and selects one of said diversity antennas and outputs a first signal to said portable radio transceiver; and switch control means which is coupled to said diversity switch means and receives a second signal from said portable radio transceiver indicative of the strength of said first signal, said switch control means outputting a third signal if a level of said second signal falls below a predetermined level, said third signal being applied to said diversity switch means for controlling the switching thereof.

2. A portable radio transceiver system as claimed in claim 1, wherein said portable transceiver means comprises:

control signal generating means for outputting a control signal which takes a control level in response to an attachment of said portable radio transceiver to said adaptor; and first switch means, which is coupled to said control signal generating means, for switching from an antenna coupled to said portable transceiver to a coupling for said diversity antennas in response to said control signal.

3. A portable radio transceiver system as claimed in claim 2, wherein said portable transceiver means further comprises:

second switch means for switching from a battery installed therein to a vehicle mounted battery which is coupled to said adaptor in response to said control signal;

a first signal generator for outputting a first reference signal;

a second signal generator for outputting a second reference signal, said second reference signal having a level which is lower than a level of said first reference signal;

third switch means for switching between said first and second signal generators in response to said control signal; and a comparator coupled to receive one of said first and second reference signals via said third switch means, said comparator comparing said second signal with one of said first and second reference signal.

4. A portable radio transceiver system comprising:

a portable radio transceiver for sending and receiving information;

means comprising diversity antennas for simultaneously sending and receiving two radio signals at slightly different frequencies, said diversity antennas being fixable to a vehicle;

an adaptor for mounting in the vehicle for removably receiving said portable radio transceiver, said adaptor being coupled to said diversity antennas, said adaptor including:

diversity switch means which is coupled to diversity antennas and selects one of said diversity antennas and outputs a first signal to said portable radio transceiver;

switch control means which is coupled to said diversity switch means, said switch control means receiving a second signal from said portable radio transceiver which is indicative of the strength of said first signal and outputting a third signal if a level of said second signal falls below a predetermined level, said third signal being applied to said diversity switch means and controlling the switching thereof;

control signal generating means for outputting a control signal which takes a control level in response to an attachment of said portable radio transceiver to said adaptor; and first switch means, which is coupled to said control signal generating means, for switching from an antenna coupled to said portable transceiver to said diversity antennas in response to said control signal.

5. A portable radio transceiver system as claimed in claim 4, wherein said portable transceiver further comprises:

second switch means for switching from a battery installed therein to a vehicle mounted battery coupled to said adaptor in response to said control signal;

a second signal generator for outputting a second reference signal, said second reference signal having a level which is lower than a level of said first reference signal;

third switch means for switching between said first and second signal generators in response to said control signal; and a comparator which is coupled to receive one of said first and second reference signals via said third switch, said comparator comparing said second signal with said one of said first and second reference signals.

6. A portable radio transceiver system comprising:

a portable radio transceiver for sending and receiving information;

means comprising diversity antennas for simultaneously sending and receiving two radio signals at slightly different frequencies, said diversity antennas being fixable to a vehicle;

an adaptor for mounting in the vehicle for removably receiving said portable radio transceiver, said adaptor being coupled to said diversity antennas, said adaptor including;

diversity switch means which is coupled to said diversity antennas and selects one of said diversity antennas and outputs a first signal to said portable radio transceiver;

switch control means which is coupled to said diversity switch means, said switch control means receiving a second signal from said portable radio transceiver which is indicative of the strength of said first signal and outputting a third signal if a level of said second signal falls below a predetermined level, said third signal being applied to said diversity switch means and controlling the switching thereof;

control signal generating means for outputting a control signal which takes a control level in response to an attachment of said portable radio transceiver to said adaptor;

first switch means, which is coupled to said control signal generating means, for switching from an antenna coupled to said portable transceiver to said diversity antennas in response to said control signal second switch means for switching from a battery installed therein to a vehicle mounted battery coupled to said adaptor in response to said control signal;

a first signal generator for outputting a first reference signal;

a second signal generator for outputting a second reference signal, said second reference signal having a level which is lower than a level of said first reference signal;

third switch means for switching between said first and second signal generators in response to said control signal; and a comparator which is coupled to receive one of said first and second reference signals via said third switch, said comparator comparing said second signal with said one of said first and second reference signals.

* * * * *